United States Patent Office 3,157,669
Patented Nov. 17, 1964

3,157,669
PREPARATION OF ISOXAZOLE COMPOUNDS
John Thomas Plati, Rutherford, and Wilhelm Wenner, Upper Montclair, N.J., assignors to Hoffmann-La Roche Inc., Nutley, N.J., a corporation of New Jersey
No Drawing. Filed July 17, 1962, Ser. No. 210,580
7 Claims. (Cl. 260—307)

The present invention relates to aminoisoxazoles, to intermediates therefor, and to methods for their preparation.

The aminoisoxazoles prepared by the processes of the invention have the formula:

(I)

wherein R is H or lower alkyl, and $R_1$ is H or lower alkyl; however, at least one of R and $R_1$ is lower alkyl, preferably methyl. Some of the compounds within the above formula are new compounds, in particular, compounds wherein both R and $R_1$ are lower alkyl.

Examples of compounds having the above formula include 3-amino-4,5-dimethylisoxazole, 3-amino-4-methyl-5-ethylisoxazole, 3-amino-4,5-dibutylisoxazole, 3-amino-5-methylisoxazole, 3-amino-5-ethylisoxazole, etc.

Compounds of Formula I are useful as intermediates in the preparation of $N^1$-(mono- or dialkyl-3-isoxazolyl) sulfanilamides which in turn are useful in the treatment of bacterial infections, such as those caused by *E. coli*, Pneumococci, Streptococci, Staphylococci, etc. The above sulfanilamides can be prepared from the compounds of Formula I by reacting a compound of Formula I with a sulfanilyl halide having an amino group precursor, e.g. an acetyl group, in the para-position, and converting the amino group precursor in the resulting product into a free amino group, e.g. by hydrolysis.

The aminoisoxazoles of Formula I can be prepared in accordance with the following reaction scheme:

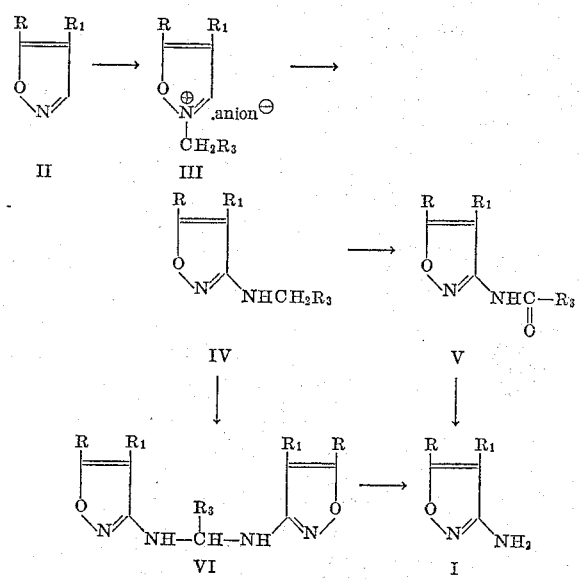

In the above reaction scheme R and $R_1$ have the meaning given above for compounds of Formula I, and $R_3$ is hydrogen or $C_1$-$C_6$ alkyl, preferably hydrogen. The anion in Formula III is the anion from the alkylating agent, as described below.

The process of the invention is carried out by: (a) first reacting a mono- or di lower alkyl isoxazole of Formula II with either a lower alkyl sulfate, preferably a lower alkyl ester methyl sulfate; or/of para-toluene sulfonic acid; or a lower alkyl halide, e.g., methyl iodide, methyl bromide, methyl chloride, etc. The reaction can be carried out in the absence of a solvent, but since the reaction is very vigorous and difficult to control, it is preferred to carry out the reaction in the presence of an inert hydrocarbon solvent, e.g. benzene, toluene, xylene, ethyl acetate, etc. The product is an isoxazolium salt of Formula III, the anion being the anion of the alkylating agent, e.g. chloride, methosulfate, p-toluene-sulfonate, etc. (b) The salt of Formula III is then treated with hydroxylamine or an acid addition salt thereof, e.g. the hydrochloride, sulfate, etc., to yield a compound of Formula IV. (c) The latter compound is then treated with an oxidizing agent, e.g. manganese dioxide, hydrogen peroxide, lower aliphatic peracids such as peracetic acid, organic peracids such as perphthalic acid and perbenzoic acid etc., to form a compound of Formula V. (d) The latter compound is then treated with aqueous hydrogen peroxide or hydrochloric acid to yield a compound of Formula I. When manganese dioxide is employed as the oxidizing agent, the formyl derivative can be isolated; however, with certain oxidizing agents such as hydrogen peroxide, the compound of Formula IV is converted directly into the compound of Formula I.

An alternate and preferred process for converting the compound of Formula IV into a compound of Formula I involves the steps of treating the compound of Formula IV with potassium permanganate as an oxidizing agent, preferably in the presence of manganese sulfate, in aqueous solution. However, with this oxidizing agent, the formyl derivative is not obtained. A compound of Formula VI is obtained instead. This compound of Formula VI is then treated with an aqueous alkali metal bisulfite, preferably sodium bisulfite, to yield the compound of Formula I together with quantities of alkali metal N-(mono- or di-lower alkyl-3-isoxazolyl)aminomethane sulfonate having the formula:

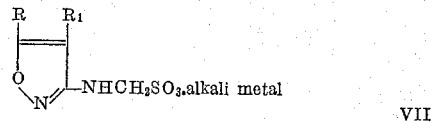

VII wherein R and $R_1$ have the meaning given above. Treatment of this alkali metal salt with hydrochloric acid results in the formation of the compound of Formula I.

The invention will be better understood by reference to the following examples which are given for illustration purposes only and are not meant to limit the invention.

EXAMPLE 1

A. *Preparation of 2,4,5-Trimethyl-Isoxazolium Methosulfate*

A mixture of 75 g. of 4,5-dimethylisoxazole, 96 g. of dimethyl sulfate and 750 ml. of toluene are stirred and maintained at a temperature of 90° C. for 18.5 hours using a steam bath. During this time a heavy insoluble phase weighing 184 g. gradually separates, which is 2,4,5-trimethyl-isoxazolium methosulfate. The toluene layer is extracted twice, each time with 225 ml. of water, and the heavy phase dissolved in the combined aqueous extracts.

B. *Preparation of 3-Methylamino-4,5-Dimethylisoxazole*

The aqueous solution obtained above is placed in a flask fitted with a stirrer and thermometer and 54 g. of hydroxylamine hydrochloride added thereto. Then 112 g. of 50% sodium hydroxide solution is added at a temperature below 15° C. during about 45 minutes. The solution is now practically neutral to pH paper. Stirring is continued for one hour in an ice bath, the ice bath is removed, and stirring is continued for an additional hour during which the mixture gradually warms to room temperature. The mixture is then placed on a steam bath, warmed to 85° C. and maintained above this temperature for 15 minutes. The solution becomes turbid, and the oil gradually separates. Upon cooling with stirring, the oil gradually solidifies into a crystalline mass, 3-methylamino-4,5-dimethylisoxazole, weighing 50 g.; M.P. 71–73° C.

C. *Preparation of 3-Formamido-4,5-Dimethylisoxazole*

Manganese dioxide is prepared by adding a solution of 180 g. of $MnSO_4.H_2O$ in 400 ml. of water to a solution of 105 g. of potassium permanganate, 5 ml. of concentrated sulfuric acid and 2 liters of water, the addition taking place with stirring during the course of 20 minutes. The manganese dioxide is filtered, washed with water, dried in a vacuum oven at 70° for ten hours, and then dried over potassium hydroxide in a vacuum desiccator for about one day; yield 177 g.

To a stirred solution of 3.0 g. of 3-methylamino-4,5-dimethylisoxazole in 300 ml. of chloroform is added the manganese dioxide prepared above. The temperature rises to 41° C. Stirring is continued for 2.5 hours, during which time the temperature gradually drops to room temperature. The mixture is filtered and the insoluble material washed with fresh chloroform and the washings combined with the filtrate. The mixture is evaporated to dryness under vacuo yielding 1.15 g. of residue, M.P. 96–100° C. Crystallization from alcohol yields 3-formamido-4,5-dimethylisoxazole, M.P. 112–113.5° C.

D. *Preparation of 3-Amino-4,5-Dimethylisoxazole*

A mixture of 0.5 g. of 3-formamido-4,5-dimethylisoxazole, 1.5 ml. of water and 1.5 ml. of 30% hydrogen peroxide is warmed to 60° C. and maintained at this temperature for one hour with occasional stirring. The mixture is cooled, yielding 0.43 g. of 3-amino-4,5-dimethylisoxazole, M.P. 112–115° C. Recrystallization gives a melting point of 115–117° C.

EXAMPLE 2

A. *Preparation of Methylenedi-(3-Amino-4,5-Dimethylisoxazole)*

To a mixture of 18.2 g. of $MnSO_4.H_2O$ in 400 ml. of water and 50 g. of 3-methylamino-4,5-dimethylisoxazole prepared as in Example 1, there is added with stirring during the course of one hour a solution of 51.5 g. of potassium permanganate in one liter of water. After stirring for an additional 30 minutes, 300 ml. of chloroform are added to dissolve the organic portion of the precipitate, and the mixture is filtered. The filter cake is washed with a total of 150 ml. of chloroform, the chloroform washings and the filtrate are combined and evaporated under vacuum to yield 42.4 g. of a semi-solid residue. The residue is suspended in 200 ml. of water and shaken with 47 ml. of 6 N hydrochloric acid until most of the residue is dissolved. The remaining insoluble material, weighing 0.98 g., is removed by filtration. The acidic filtrate is cooled in an ice bath and made alkaline to pH 8–9 with 104 ml. of 10% sodium hydroxide solution. After stirring for 30 minutes in an ice bath, the precipitate is filtered. The precipitate is dried under vacuum over potassium hydroxide; weight of dry precipitate, 19.9 g. Further drying on a steam bath gives a product with a M.P. of 138–142° C. Crystallization from alcohol gives pure methylenedi-(3-amino-4,5-dimethylisoxazole), M.P. 149–151° C.

B. *Preparation of 3-Amino-4,5-Dimethylisoxazole*

A mixture of 19.9 g. of methylenedi-(3-amino-4,5-dimethylisoxazole), 19.9 g. of sodium bisulfite and 200 ml. of water is boiled and allowed to cool to room temperature and then cooled in an ice bath. The resulting precipitate consists of 7.0 g. of 3-amino-4,5-dimethylisoxazole, M.P. 115–117° C.

The aqueous filtrate is evaporated under vacuum almost to dryness to yield 8 g. of sodium N-(4,5-dimethyl-3-isoxazolyl)-aminomethanesulfonate, M.P. 228–231° C. Upon crystallization from water, the M.P. is 234–236° C.

The above sulfonate is treated with 300 ml. of 7% hydrochloric acid at the boiling point. The mixture is steam distilled until no further precipitate is obtained in the distillate with 2,4-dinitrophenylhydrazine reagent. The residual liquid is neutralized with NaOH, and the 3-amino-4,5-dimethylisoxazole filtered off. The filtrate is concentrated to obtain further yield of product.

EXAMPLE 3

A mixture of 5.0 g. of 4,5-dimethylisoxazole and 7.0 g. of diethylsulfate is cautiously heated in an oil bath until a temperature of about 140° is reached, when a spontaneous reaction is noted. The mixture is removed from the oil bath. After the temperature rises to 152°, the reaction gradually subsides and is allowed to cool to room temperature. The product is 2-ethyl-4,5-dimethylisoxazolium ethosulfate.

The 2-ethyl-4,5-dimethylisoxazolium sulfate, which is prepared in batches using the above procedure from 42.5 g. of 4,5-dimethylisoxazole, is dissolved in 225 cc. of water, and, with cooling below 15° in an ice-water bath, 30.6 g. of hydroxylamine hydrochloride is added during 30 minutes with stirring. With continued cooling 68 g. of 50% (w./w.) aqueous sodium hydroxide is added during 30 minutes. After stirring for an additional 5 minutes the mixture is heated on a steam bath to 85°, maintained at this temperature for 15 minutes, cooled and extracted three times with 100 cc. of ether. On evaporation of the ether, the residue weighed 37 g. On distillation of a 1.5 g. sample, 3-ethylamino-4,5-dimethylisoxazole, B.P. 128–130/12 mm., is obtained, which partially crystallizes in the receiver.

The 3-ethylamino-4,5-dimethylisoxazole is then oxidized according to the procedure of Example 1 to yield 3-amino-4,5-dimethylisoxazole.

EXAMPLE 4

A. *Preparation of 5-Methylisoxazole*

A mixture of ethyl formate (74 g.) and acetone (58 g.) is added portionwise to powdered sodium (23 g.) is xylene (500 ml.) with high speed stirring and cooling in a bath of ethanol to which Dry Ice is added from time to time. The addition, which requires 2.5 hours, is regulated to maintain a reaction temperature of 30 to 40°. The cold bath is then removed, the stirring stopped, and the reaction allowed to settle for 40 minutes.

Stirring is then resumed, the reaction is cooled at −5 to −10°, and water (500 ml.) is added. The aqueous phase is separated and filtered. A mixture of aniline (102 g.) and acetic acid (66 g.) is then added to the aqueous solution at 0 to −5° over a 5 minute period. The cold bath is removed, and the reaction mixture stirred for 30 minutes, before extracting with benzene. The benzene phase is dried with sodium sulfate, evaporated in vacuo, and distilled. The product (57.55 g.), 4-anilino-3-buten-2-one, distills at 138–148°/8 mm., and crystallizes in the receiver.

The 4-anilino-3-buten-2-one (57.55 g.) is dissolved in warm ethanol (200 ml.), and hydroxylamine hydrochloride (37.6 g.) in water (65 ml.) is added. The mixture is refluxed 1.5 hours. After cooling, a solution of cadmium chloride (131 g.) in water (130 ml.) is added. The crystalline precipitate is filtered after 1.5 hours, washed on the filter with ethanol, then with ether, and air dried.

The solid (130 g.) is mixed with an equal weight of water and distilled from a Claisen flask. The two-phased distillate, which distills at 95–110°, is extracted with three 80 ml. portions of ether. After drying with sodium sulfate, the ether is distilled off, and the residue distilled from a Claisen flask. The yield of 5-methylisoxazole boiling at 121–123° is 16.46 g.

B. *Preparation of 5-Methyl-3-Methylaminoisoxazole*

A mixture of toluene (230 ml.), 5-methylisoxazole (23.13 g.), and dimethyl sulfate (35.1 g.) is stirred and heated for 16 hours on the steam bath. After cooling, the lower phase containing 2,5-dimethyl-isoxazolium methosulfate is separated (51.4 g.), and the toluene layer is extracted with two portions of water (100 and 75 ml.).

The aqueous extracts are combined with the lower phase, chilled, and hydroxylamine hydrochloride (19.5 g.) is added. With cooling below 15°, 50% aqueous sodium hydroxide (44.5 g.) is carefully added, over a 50 minute period, to adjust the pH to about 7. Stirring is continued for one hour with cooling in ice, then for one hour after removal of the ice bath. The reaction is heated on the steam bath for 15 minutes after the temperature reaches 85°. After cooling in ice to 25°, the mixture is extracted with four 90 ml. portions of ether. The ether is dried with sodium sulfate, evaporated, and the residue distilled in vacuo to yield 14.8 g. of partly crystalline product distilling at 109–115°/8 mm.

Crystallization of 13.3 g. of the distillate from 15 ml. of absolute ether at −10° followed by a recrystallization from 9 ml. of ether at 0° yields 3.80 g. of 5-methyl-3-methylaminoisoxazole melting at 50–56°. Subsequent recrystallizations from ether and from water raises the melting point to 57–59°.

C. *Preparation of 3-Amino-5-Methylisoxazole*

5-methyl-3-methylaminoisoxazole (2.30 g.) (M.P. 50–56°) is added to a solution of manganous sulfate monohydrate (4.17 g.) in water (23 ml.). A solution of potassium permanganate (2.59 g.) in water (45 ml.) is added over a 40 minute period. Stirring is continued for 45 minutes. Chloroform (45 ml.) is added to dissolve the organic portion of the precipitate, the mixture is filtered, and the chloroform phase evaporated in vacuo. The residue is triturated with 3.5 ml. of 6 N hydrochloric acid and 10 ml. of water, the insoluble portion filtered off, and the filtrate carefully adjusted to pH 8 by addition of 10% sodium hydroxide (7.5 ml.). The supernatant liquid is decanted from the precipitated oil. By centrifuging the decantate an additional quantity of insoluble oil is obtained. The combined oily product is dissolved in chloroform (10 ml.), a few drops of water are separated, and the chloroform evaporated in vacuo to leave 1.23 g. of residue.

The residue is refluxed for 10 minutes with sodium bisulfite (1.23 g.) in water (12 ml.). The mixture is cooled and filtered, and the filtrate extracted with six 10 ml. portions of ether. The ether is dried with sodium sulfate and evaporated in vacuo. The residue (0.51 g.) is dissolved in benzene (4 ml.). Addition of petroleum ether (3 ml.) gives an oily precipitate which mostly solidifies on cooling. The supernatant liquid is decanted and the residue crystallized from benzene (2 ml.) and petroleum ether (1 ml.). This solid (0.1388 g., M.P. 53–59°) is crystallized from 0.5 ml. of ether to obtain 62.2 mg. of 3 - amino - 5 - methylisoxazole melting at 59–61° C.

While it does not comprise part of the invention now described and claimed, the preparation of $N^1$-(4,5-dimethyl-3-isoxazolyl)-sulfanilamide is given hereinafter to illustrate how the compounds of Formula I can be converted into sulfanilamides useful in the treatment of bacterial infections.

*Preparation of $N^1$-(4,5-Dimethyl-3-Isoxazolyl)-$N^4$-Acetyl-Sulfanilamide*

To a solution of 8.4 g. of 3-amino-4,5-dimethylisoxazole in 42 ml. of dry pyridine, 16.8 g. of N-acetylsulfanilyl chloride is added with shaking. The temperature of this solution rises to 50° C. After standing for one hour, 225 ml. of water is added and the mixture allowed to crystallize slowly during the course of two hours. The crystals are filtered, washed thoroughly with water, and dried in vacuo over potassium hydroxide; yield 18.4 g. of $N^1$-(4,5-dimethyl-3-isoxazolyl)-$N^4$-acetylsulfanilamide, M.P. 227–230° C. After recrystallization from ethanol, the melting point is 228–230° C.

*Preparation of $N^1$-(4,5-Dimethyl-3-Isoxazolyl)-Sulfanilamide*

A mixture of 17.4 g. of the above $N^4$-acetyl compound and 174 ml. of 10% sodium hydroxide is heated with stirring on a steam bath for one hour. The resulting solution is poured into 348 ml. of boiling water, 42 ml. of acetic acid added, and the mixture allowed to crystallize. The resulting crystals are filtered, washed with water and dried under vacuum over potassium hydroxide to yield 14.3 g. of $N^1$-(4,5-dimethyl-3-isoxazolyl)-sulfanilamide, M.P. 193–195.5° C.

We claim:

1. A compound of the formula:

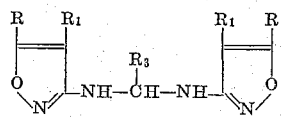

wherein R and $R_1$ are selected from the group consisting of hydrogen and lower alkyl wherein at least one of R and $R_1$ is lower alkyl, and $R_3$ is selected from the group consisting of hydrogen and lower alkyl having less than 7 carbon atoms.

2. Methylenedi-(3-amino-4,5-dimethylisoxazole).

3. A compound of the formula:

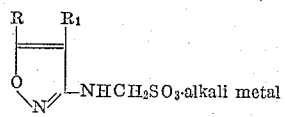

wherein R and $R_1$ are selected from the group consisting of hydrogen and lower alkyl wherein at least one of R and $R_1$ is lower alkyl.

4. Sodium N - (4,5-dimethyl-3-isoxazolyl)-aminomethane-sulfonate.

5. A process for the preparation of a compound of the formula:

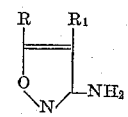

I wherein R and $R_1$ are selected from the group consisting of hydrogen and lower alkyl, wherein at least one of R and $R_1$ is lower alkyl, comprising the steps of:

(a) treating a compound of the formula:

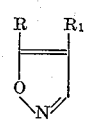

II wherein R and $R_1$ have the meaning given above, with a compound selected from the group consisting of a lower alkyl sulfate, a lower alkyl halide, and a lower alkyl ester of p-toluenesulfonic acid to form a compound of the formula:

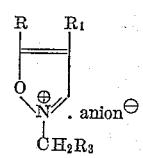

III wherein R and $R_1$ have the meaning given above, $R_3$ is selected from the group consisting of hydrogen and lower alkyl having less than 7 carbon atoms, and anion represents an anion selected from the group consisting of halide, alkosulfate, and p-toluenesulfonate;

(b) treating the compound of Formula III with a compound selected from the group consisting of hydroxylamine and an acid addition salt thereof to form a compound of the formula:

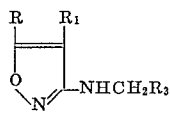

IV wherein R, $R_1$, and $R_3$ have the meaning given above;
(c) treating the compound of Formula IV with potassium permanganate to form a compound of the formula

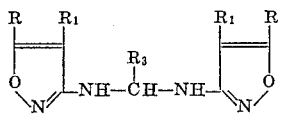

VI wherein R, $R_1$, and $R_3$ have the meaning given above; and
(d) treating the compound of Formula VI with an alkali metal bisulfite to form a compound of Formula I.

6. A process comprising the steps of:
(a) reacting 4,5-dimethylisoxazole with dimethyl sulfate;
(b) treating the reaction product thereof with hydroxylamine hydrochloride to form 3-methylamino-4,5-dimethylisoxazole;
(c) treating the latter compound with potassium permanganate and manganese sulfate in aqueous solution to form methylenedi-(3-amino-4,5-dimethylisoxazole);
(d) treating the latter compound with sodium bisulfite to yield 3-amino-4,5-dimethylisoxazole.

7. A process comprising the steps of:
(a) reacting 5-methylisoxazole with dimethyl sulfate;
(b) reacting the reaction product thereof with hydroxylamine hydrochloride to form 3-methylamino-5-methylisoxazole;
(c) reacting the latter compound with potassium permanganate and manganese sulfate in aqueous solution to form methylenedi-(3-amino-5-methyl-isoxazole);
(d) reacting the latter compound with sodium bisulfite to yield 3-amino-5-methylisoxazole.

References Cited in the file of this patent
UNITED STATES PATENTS

| | | |
|---|---|---|
| 2,888,455 | Kano et al. | May 26, 1959 |
| 3,073,839 | Kano et al. | Jan. 15, 1963 |

FOREIGN PATENTS

| | | |
|---|---|---|
| 875,458 | Great Britain | Aug. 23, 1961 |

OTHER REFERENCES

Claisen: Ber. Deut. Chem., vol. 42, pages 59–68 (1909).
Kano et al.: Chem. Abstracts, vol. 51, page 17889 (1957).